D. A. JOHNSON
Thill-Coupling.

No. 198,803. Patented Jan. 1, 1878.

Witnesses.
E. C. Perkins.
W. J. Pratt.

Inventor.
Daniel A. Johnson,
by Crosby & Gregory, Attys.

UNITED STATES PATENT OFFICE.

DANIEL A. JOHNSON, OF BOSTON, MASSACHUSETTS.

IMPROVEMENT IN THILL-COUPLINGS.

Specification forming part of Letters Patent No. 198,803, dated January 1, 1878; application filed October 18, 1877.

*To all whom it may concern:*

Be it known that I, DANIEL A. JOHNSON, of Boston, in the county of Suffolk and State of Massachusetts, have invented an Improved Thill-Coupling, of which the following is a specification:

This invention has reference to thill-couplings; and consists in a coupling composed of two disks, one of which is adapted to be connected with the thill-iron, and the other with the axle, the two disks being so held together by a bolt and a spring that they remain at all times pressed toward each other, to thereby compensate for wear and prevent noise.

Figure 1:
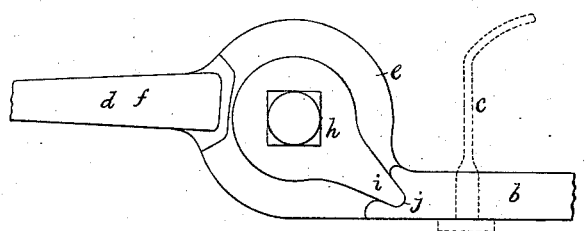
Figure 2:
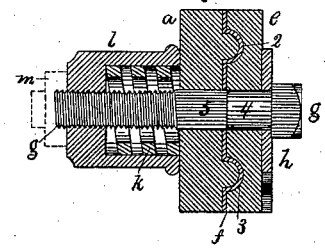
Figure 3:
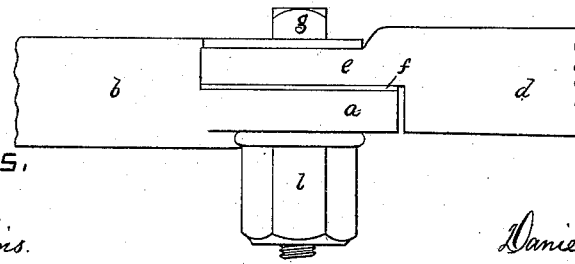

Figure 1 represents my improved thill-coupling in side elevation; Fig. 2, a cross-section, the confining-bolt being shown in elevation; and Fig. 3, a top view thereof.

In the drawing, the fixed disk $a$ projects from the bar $b$, to be connected, as usual, with the axle by means of an axle-clip, $c$, as shown in dotted lines.

The movable disk $e$ has a projecting portion, $d$, adapted to be attached, in any usual manner, to the thills. The face of the disk $a$ is shown as provided with an annularly-projecting rib, 2, to fit an annular cavity, 3, made in the disk $e$. The shape of the projection and cavity may be varied from that shown in Fig. 2 without departing from this invention, so long as the projection on one fits a concavity in the other and the parts are so shaped and fitted together as to follow up the abrasive wear between them.

It is obvious that it is immaterial which disk is provided with the projection and which with the concavity. I prefer to place between the disks a washer or wearing-plate, $f$, of metal, leather, or other suitable material commonly used for washers.

The bolt $g$ is made round at 4, where it fits the movable disk connected with the thill, and square, or of other irregular shape, as at 5, where it fits the stationary or fixed disk, or vice versa, so that such bolt cannot turn and become detached from the nut which holds the bolt, or vice versa, by the action of the thills.

Instead of making this bolt square, as described, I may place a friction-plate, $h$, between the bolt-head and the movable disk, and a tail-piece, $i$, of the plate may fit a notch, $j$, in the iron $b$ to retain the plate stationary, thereby permitting the bolt-head to rest against a stationary rather than against a moving surface. This bolt, passed through the two disks, is provided with a spring, $k$, one end of which bears against one of the disks, while the position of the other end is governed by a nut fitted to the screw-threaded portion of the bolt.

In the drawings this spring is contained within a sleeve, $l$, the end of which is screw-threaded, to fit the threads of the bolt. This spring, held in this way, acts to press the movable toward the fixed disk, and to keep them together, so that all wear will be compensated for, and that the coupling will not rattle.

Instead of making the sleeve serve the purpose of the nut, it is obvious that the same result would be gained by permitting the sleeve to move freely over the bolt, under the action of a nut, $m$, as shown in dotted lines.

Two disks held together, as herein described, by a bolt and spring provided with ears, as common with whiffletree-plates, may be employed to retain the whiffletree snugly in position upon the thills.

By the term "disk," as herein employed, is meant two single surfaces adapted to be pressed together, and the disk may be cut circular or of other shape, so long as one turns upon the other when held by the bolt and spring.

I claim—

1. The combination, with two disks fitted together, substantially as described, and a bolt and nut, of a spring to press the two disks together, substantially as described.

2. In combination, the two disks, the bolt $g$, extended through such disks, and provided with the portions 4 5, the spring, and a nut to operate all, substantially as described.

In testimony whereof I have signed my name to this specification in the presence of two subscribing witnesses.

DANIEL A. JOHNSON.

Witnesses:
G. W. GREGORY,
S. B. KIDDER.